United States Patent
Tan et al.

(10) Patent No.: US 9,965,334 B1
(45) Date of Patent: May 8, 2018

(54) SYSTEMS AND METHODS FOR VIRTUAL MACHINE STORAGE PROVISIONING

(71) Applicant: VCE Company, LLC, Richardson, TX (US)

(72) Inventors: Michael Tan, Palo Alto, CA (US); Akshaya Mahapatra, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 102 days.

(21) Appl. No.: 14/299,846

(22) Filed: Jun. 9, 2014

(51) Int. Cl.
*G06F 9/455* (2006.01)
*G06F 9/50* (2006.01)

(52) U.S. Cl.
CPC .................. *G06F 9/5077* (2013.01)

(58) Field of Classification Search
CPC .................................................... G06F 9/5077
See application file for complete search history.

(56) References Cited

U.S. PATENT DOCUMENTS

| | | | | |
|---|---|---|---|---|
| 9,122,418 B2* | 9/2015 | Morse | ............... | G06F 3/0605 |
| 2005/0262505 A1* | 11/2005 | Esfahany | ............ | G06F 9/5077 718/1 |
| 2008/0270733 A1* | 10/2008 | Sakaguchi | ........... | G06F 3/0608 711/173 |
| 2012/0239896 A1* | 9/2012 | Sobel | ................ | G06F 3/0608 711/165 |
| 2013/0054890 A1* | 2/2013 | Desai | ................. | G06F 3/0604 711/114 |
| 2013/0205297 A1* | 8/2013 | Shimogawa | .......... | G06F 9/455 718/1 |
| 2013/0290541 A1* | 10/2013 | Hatasaki | .............. | G06F 9/5077 709/226 |
| 2014/0058871 A1* | 2/2014 | Marr | ................. | G06F 9/45533 705/26.1 |
| 2014/0189682 A1* | 7/2014 | Crudele | ............. | G06F 9/45558 718/1 |
| 2014/0258446 A1* | 9/2014 | Bursell | ................ | G06F 15/177 709/217 |

* cited by examiner

*Primary Examiner* — Diem Cao
(74) *Attorney, Agent, or Firm* — Polsinelli PC

(57) ABSTRACT

Methods and/or systems for provisioning storage capacity of a virtual machine are disclosed. Storage provisioning requests are received from virtual machines executing within a physical host environment. The provisioning requests are validated and processed to generate or otherwise expand storage capacities of the requesting virtual machines.

15 Claims, 4 Drawing Sheets

SYSTEMS AND METHODS FOR VIRTUAL MACHINE STORAGE PROVISIONING

TECHNICAL FIELD

Aspects of the present disclosure relate to virtual machines, and in particular, provisioning storage capacity for a virtual machine.

BACKGROUND

Large scale information technology ("IT") organizations—e.g., those typically found in enterprise-class organizations and service providers—have embraced virtualization as a mechanism for providing various computing services to users in a more efficient and manageable manner. For example, many IT organizations employ virtualization techniques to transform a physical computing component, such as a physical server, into multiple "virtual" servers (commonly referred to as "virtual machines") that emulate the functionality of the physical server. The use of virtualization computing concepts typically requires an IT organization to run hundreds of applications on hundreds or even thousands of virtual components that are located on or otherwise associated with globally disparate physical resources. As a result, time-consuming and manual administration is often required for the IT organization to provision and manage virtualized computing components, such as storage, in relation to its physical resources and/or applications.

SUMMARY

Aspects of the present disclosure involve systems, methods, and/or non-transitory computer-readable mediums for provisioning virtual machine storage. The systems, methods, and/or non-transitory computer-readable may include instructions, executable by a processor. The instructions include determining whether at least one logical representation of a physical storage requires an increase in capacity, the at least one logical representation corresponding to a virtual machine maintained in a data store. The instructions further include, when the increase in capacity of the at least one logical representation is required: increase, capacity of the at least one logical representation based on the increase in capacity; increase capacity of the data store based on the increase in capacity and increase capacity of a virtual machine disk corresponding to the virtual machine based on the increase in capacity.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve systems and methods for provisioning storage capacities of virtual machines operating in a virtual environment deployed on one or more physical computing devices, such as a host server. Generally speaking, a virtual machine represents a software implementation of a physical machine that operates based on the hardware architecture and functions of the physical machine that the virtual machine is emulating. Accordingly, a virtual machine executing on a host server, represents a software-based emulation of the host server.

In various aspects, one or more of the virtual machines executing at the host server receives a storage provisioning request and automatically initiates a process to either generate new storage capacity or expand existing storage capacity corresponding to the virtual machine. The process may involve the provisioning (e.g. generation or expansion) of various logical components of the virtual environment that are currently supporting the virtual machine, such as logical unit number ("LUN") volumes, data stores, and the like. The process may further involve executing logic to expand logical drives exposed by the virtual machine to various applications, such as a guest operating system currently executing at the requesting virtual machine.

Figure 1:
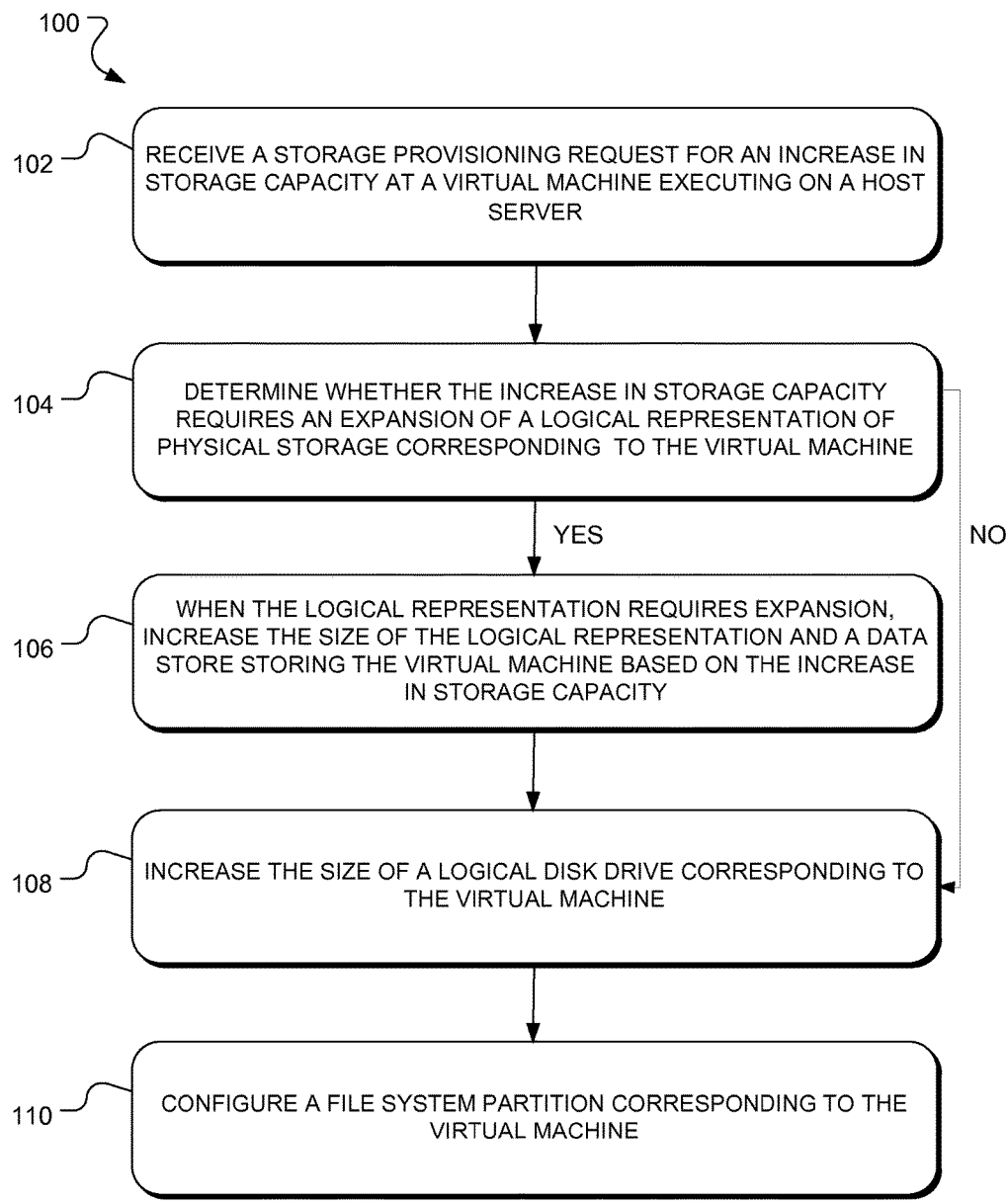
FIG. 1 is a flowchart illustrating an example process for performing workload analysis, according to aspects of the present disclosure.
Figure 2A:
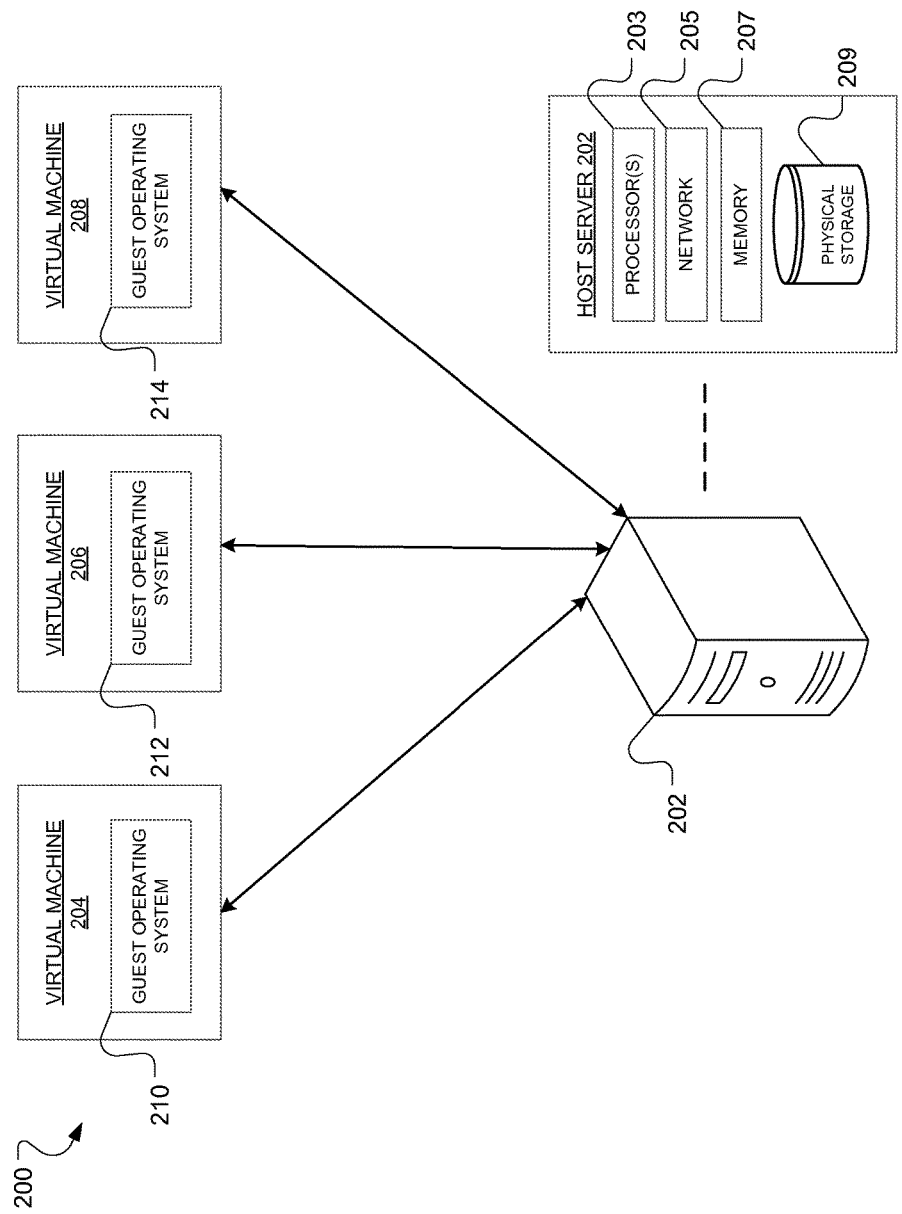
FIGS. 2A-2B are block diagrams illustrating a computing environment for performing virtual machine storage provisioning, according to aspects of the present disclosure.
Figure 2B:
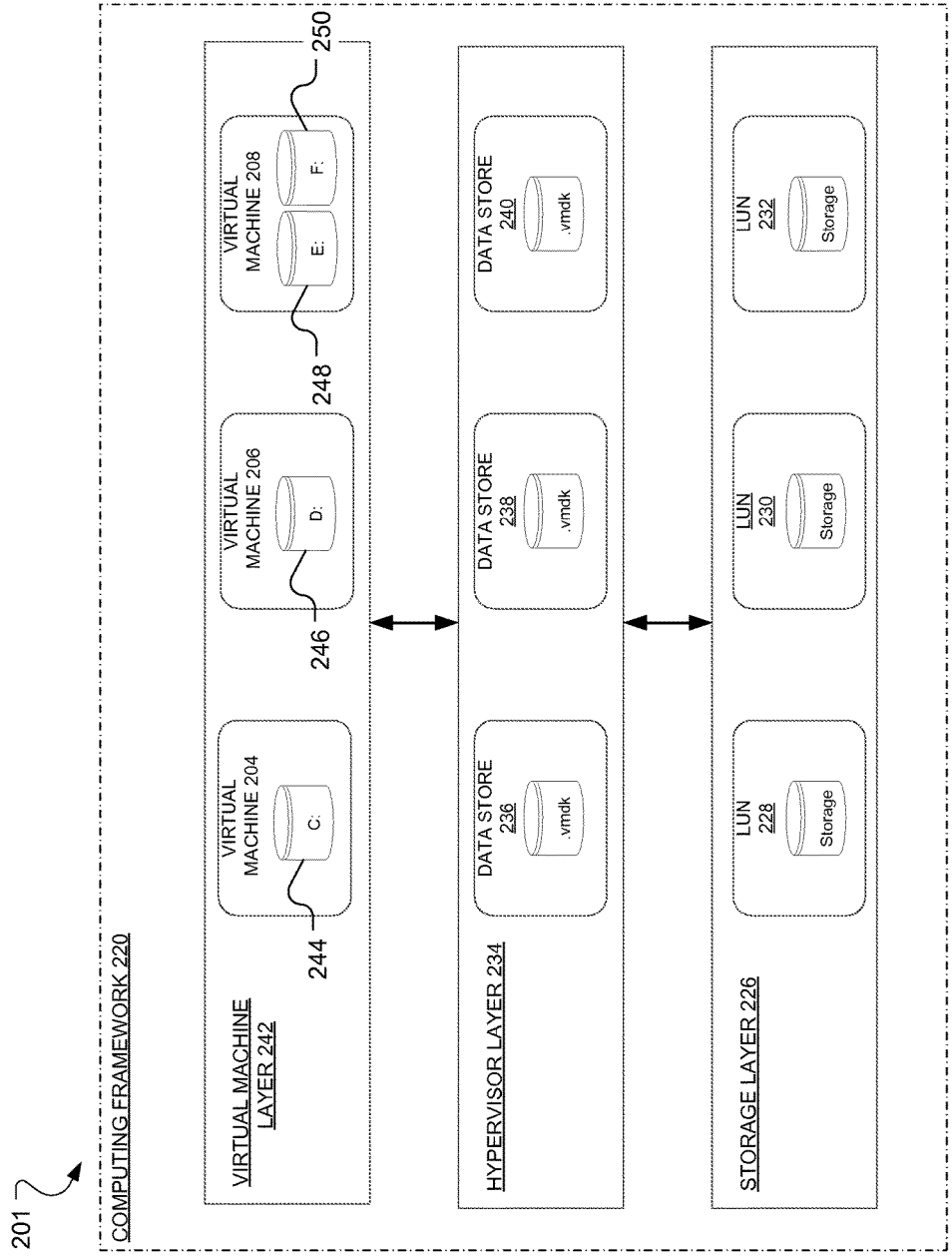

An illustrative process and/or system for expanding the storage capacity of virtual machines are depicted in FIGS. 1 and 2. FIG. 1 illustrates an example process 100 for automatically expanding the storage capacity of a virtual machine. FIGS. 2A-2B illustrate a computing architecture 200 and computing framework 220 including hardware and/or software components that may be used to perform or otherwise execute the process 100 of FIG. 1.

Referring initially to FIG. 2A, the computing architecture 200 includes a host server 202, which may include one or more processors (CPUs) 203 (e.g., a plurality of processors in a parallel processing environment), a memory 207, a storage 209, and various network resources 205, of any suitable type. Although the storage 209 is depicted as being a part of the host server 202, it is contemplated that the storage may be located externally or elsewhere, in operable communication with the host server 202. In one embodiment, the host server 202 may be included or otherwise integrated within a converged infrastructure of the computing architecture 200. In another aspect, the computing architecture 200 comprises a combination of converged infrastructures configured in a cloud computing environment. Generally speaking, converged infrastructures involve multiple computing components pre-integrated into an optimized computing solution. The computing components of a converged infrastructure may include servers, data storage components, networking equipment and software for managing the integrated components. To assist in the scalability, management, and sharing of resources, particularly in large data center environments, converged infrastructures may involve a pool of server, storage and networking capacities, typically virtualized, that may be shared by multiple applications. While some examples disclosed herein may be implemented in converged infrastructures, also sometimes referred to as unified computing systems, fabric-based computing systems, and dynamic infrastructures, systems and method described herein may be applied to other computing environments, and are not limited to converged infrastructures.

The host server 202 executes one or more virtual machines 204-208 that represent software implementations of the various components of the host server 202. Each virtual machine 204-208 functions as though it has independent and complete access to the processor 203, memory 207, storage 209, and/or networking resources 205 of the host server 202.

Each of the virtual machines 204-208 may run or otherwise execute an independent operating system illustrated as guest operating systems 210-214. Each guest operating system 210-214 functions as a conventional operating system. For example, the virtual machine 204 may execute a RedHat™ Linux operating system as the guest operating system 210, while the virtual machine 206 may execute a Microsoft Windows™ operating system as the guest operating system 212, both of which are different or the same as the guest operating system 214 executing on the virtual machine 208. It its contemplated that the virtual machines 204-208 may execute any type of independent operating system as a guest operating system and/or any applications capable of being executed on such guest operating systems.

FIG. 2B provides an illustration of a computing framework 220 that logically depicts a virtual environment 201 of the host server 202 included within the computing architecture 200 of FIG. 2A, according to one embodiment. In the illustrated embodiment, the computing framework 220 is divided into three layers: a virtual machine layer 242, a hypervisor layer 234, and storage system layer 226. At the bottom of the framework 220 is the storage system layer 226, which involves physical storage (e.g. a hard disc) logically represented and/or accessed according to a LUN. Stated differently, the storage system layer 226 represents physical storage as logical volumes identified by LUN numbers to the hypervisor layer 226. In the illustrated embodiment, three logical volumes 228-232 are depicted as LUNs.

The hypervisor layer 234 includes logic and/or processes that abstract the processor 203, memory 207, storage 209, and network resources 205, of the host server 202 into the virtual machines 204-208. In the illustrated embodiment, the virtual machines 204-208 are depicted as ".vmdk" files maintained on logical containers, or data stores 236-240. It is contemplated, however, that the virtual machines 204-208 may be stored as a single file, or set of files of any suitable type and other than a .vmdk file. As described above, storage is presented to the hypervisor layer 226 according to a LUN (i.e. the LUNs 228-232). Each respective LUN is treated as a storage target that is associated with a particular virtual machine (e.g., 204-208) managed by the hypervisor layer 234. For example, in the illustrated embodiment, the virtual machine 204 may be associated with LUN 228, the virtual machine 206 may be associated with LUN 230, and virtual machine 208 may be associated with LUN 232.

The virtual machine layer 242 accesses the storage by allocating a portion of the storage seen at the hypervisor layer 234, as one or more logical drives 244-250 accessible by the guest operating systems executing on the virtual machines 204-208. More specifically, each .vmdk (i.e., virtual machine) allocates a portion of the storage to the respective virtual machine 204-208 with which the .vmdk is associated. The logical drives 244-250 are exposed to guest operating system running on the virtual machines. Thus, as illustrated in FIG. 2B, one or more logical disk drives, "C:", "D:", "E:," and "F:" are provided at 244-250 respectively, that represent the various logical drives exposed to guest operating systems running on the virtual machines 204-208.

Referring now to FIG. 1, the process 100 for provisioning storage within a virtual machine is provided, according to one embodiment. As illustrated, process 100 begins with determining whether a virtual machine requires the provisioning of storage capacity. In particular, one or more of the virtual machines 204-208, executing at the host server 202, may receive a storage provisioning request indicating that the respective virtual machine requires, for example, an increase in storage capacity (operation 102). The storage provisioning request may be received from the guest operating system executing on, or otherwise located at, the virtual machine receiving the storage provisioning request. For example, a user may interact with the guest operating system 210 to generate a storage provisioning request indicating an increase in storage capacity, which may be received by the virtual machine 204 and/or the host server 202 executing the virtual machine 204. In another embodiment, the host server 202 may monitor the Input/Output capacity of the virtual machines 204-208 and automatically trigger a provisioning request when more storage is needed.

In response to the storage provisioning request, the requesting virtual machine automatically initiates instruction(s), process(es) and/or a service that determines whether the increase storage capacity requires an expansion of the LUN corresponding to the virtual machine (operation 104). Stated differently, in order to support the increase in storage capacity of the virtual machine, the LUN corresponding to the virtual machine may require an increase in size. Whenever an increase of the LUN is required, the host server 202 will validate whether there is enough space in the data store maintaining the virtual machine to support the increase in size of the LUN. For example, when an increase of virtual machine storage is requested (e.g., user input or via a policy), the host server 202 may employ an application programming interface provided, for example at the hypervisor layer 234, to determine whether there is enough space in the data store. A policy is a course of action selected from alternatives based on given set of conditions. For example, if the data store is higher than a pre-determined amount (e.g., 80%) the host server 202 increases or otherwise initiates a process to increase the size of the data store and/or LUN.

When it is determined that the LUN exposing storage to the virtual machine requires expansion to support the increase in storage capacity for the virtual machine, both the LUN and the data store corresponding to the virtual machine may be expanded (operation 106). In particular, the host server 202 automatically increases the size of both the logical volumes (i.e. LUNs) of physical storage corresponding to the virtual machine and the data store maintaining the virtual machine. For example, referring to the example above, the host server 202 may increase the size of the LUN 228 and data store 236 corresponding to the virtual machine 204 based on the requested increase in storage capacity. The increase in size of the LUN 228 and/or the data store 236 may be based on a policy and should generally be larger than the requested increase in size of the virtual machine.

When the LUN maintaining the virtual machine does not require expansion to support the increase in storage capacity for the virtual machine, neither the LUN nor the data store corresponding to the virtual machine is expanded. Rather, process 100 continues to operation 108, as described below.

Referring back to FIG. 1, a virtual machine disk file corresponding to the virtual machine is expanded to support the increase in capacity of the virtual machine (operation 108). In particular, the host server 202 automatically increases the size of the .vmdk of the virtual machine.

Referring to the example above, the host server 202 may increase the size of the .vmdk 236 corresponding to the virtual machine 204.

Once a virtual machine disk file corresponding to the virtual machine has been expanded, logic is executed at the guest operating system corresponding to the virtual machine to expand or otherwise resize a file system partition (operation 110). In one embodiment, each guest operating system may provide a utility to configure the file system after increasing the size of the virtual machine disk file. For example, in response to an increase in virtual machine disk size, the guest operating system 210 of the virtual machine 204 may automatically initiate a process that configures or otherwise increases the size of a disk partition, accessible via the guest operating system 210.

An illustrative example for provisioning storage capacity of a virtual machine will now be provided. Assume one or more virtual machines are currently executing within a virtual computing environment on one or more host servers, each of which are configured to execute an independent guest operating system. The virtual machines include provisioning instructions (e.g., an application) that automatically initiate the expansion of various logical components of the virtual computing environment to expand the storage capacity of the virtual machine, upon request. A user interacts with a guest operating system running on a particular virtual machine to generate a storage provisioning request requesting an increase in capacity of the particular virtual machine. In response, the provisioning instructions of the particular virtual machine determine that the requested additional storage capacity requires an increase of a LUN corresponding to the particular virtual machine. The LUN and a data store storing the particular virtual machine is increased in size or otherwise expanded enough to support the requested increase in storage capacity. Additionally, one or more logical disk drives corresponding to the virtual machine may be expanded to consume the increased capacity. Finally, a file system partition corresponding to the logical disk drives may be configured.

Thus, various aspects of the present disclosure involve systems and methods for expanding the storage capacities of virtual machines included within a virtual computing environment on a host server. The system automatically interacts with the necessary infrastructure to expand the storage needs of a virtual machine.

Figure 3:
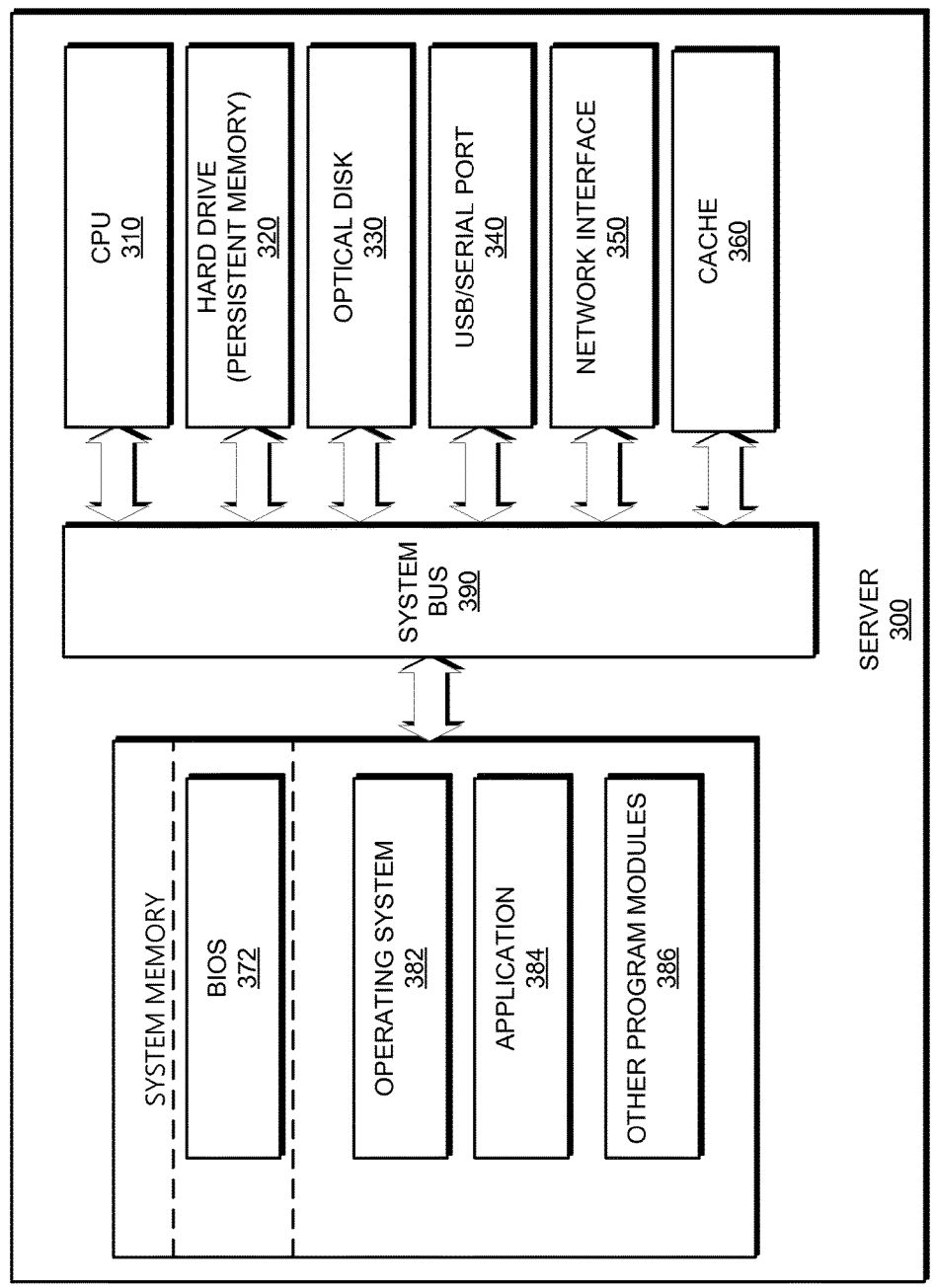
FIG. 3 is an illustration of a computing device, according to aspects of the present disclosure.

FIG. 3 illustrates an example general purpose computer 300 that may be useful in implementing the described systems (e.g. the server 202). The example hardware and operating environment of FIG. 3 for implementing the described technology includes a computing device, such as general purpose computing device in the form of a personal computer, server, or other type of computing device. In the implementation of FIG. 3, for example, the general purpose computer 300 includes a processor 310, a cache 360, a system memory 320 and a system bus 390 that operatively couples various system components including the cache 360 and the system memory 320 to the processor 310. There may be only one or there may be more than one processor 310, such that the processor of the general purpose computer 300 comprises a single central processing unit (CPU), or a plurality of processing units, commonly referred to as a parallel processing environment. The general purpose computer 300 may be a conventional computer, a distributed computer, or any other type of computer; the disclosure included herein is not so limited.

The system bus 390 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system (BIOS), containing the basic routines that help to transfer information between elements within the general purpose computer 300 such as during start-up may be stored in ROM. The general purpose computer 300 further includes a hard disk drive 320 for reading from and writing to a persistent memory such as a hard disk, not shown and an optical disk drive 330 for reading from or writing to a removable optical disk such as a CD ROM, DVD, or other optical medium.

The hard disk drive 320 and optical disk drive 330 are connected to the system bus 390. The drives and their associated computer-readable medium provide nonvolatile storage of computer-readable instructions, data structures, program engines and other data for the general purpose computer 300. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, or elsewhere, including an operating system 382, an application 384, and one or more other application programs 386. A user may enter commands and information into the general purpose computer 300 through input devices such as a keyboard and pointing device connected to the USB or Serial Port 340. These and other input devices are often connected to the processor 310 through the USB or serial port interface 340 that is coupled to the system bus 390, but may be connected by other interfaces, such as a parallel port. A monitor or other type of display device may also be connected to the system bus 390 via an interface (not shown). In addition to the monitor, computers typically include other peripheral output devices (not shown), such as speakers and printers.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for provisioning virtual machine storage comprising:
   determining, using at least one processor, whether at least one logical representation of a physical storage requires an increase in storage capacity, the at least one logical representation of the physical storage corresponding to a virtual machine maintained in a data store, wherein the increase in storage capacity is determined by the virtual machine based on a first capacity of the at least one logical representation; and
   when the increase in storage capacity is required:
      increasing at a storage layer of a virtual environment, using the at least one processor, the first capacity of the at least one logical representation by an amount of storage capacity;
      increasing at a hypervisor layer of the virtual environment, using the at least one processor, a second capacity of the data store based on the amount of storage capacity;
      increasing at a virtual machine layer, using the at least one processor, a third capacity of a virtual machine disk corresponding to the virtual machine based on the amount of storage capacity; and
      executing logic at a guest operating system executed by the virtual machine to resize a file system partition of the guest operating system based on the amount of storage capacity, wherein the file system partition corresponds to a file system managing access to the at least one logical representation of the physical storage.

2. The method of claim 1, wherein determining whether the at least one logical representation of the physical storage requires an increase in storage capacity comprises:
   receiving a request from the virtual machine indicating the required increase in storage capacity; and
   employing an application programming interface to:
      obtain data defining a current capacity of the data store; and
      require an increase in the second capacity of the data store when the current capacity of the data store exceeds a pre-determined percentage.

3. The method of claim 1, further comprising:
   when the increase in capacity does not require an increase in the at least one logical representation, increase the third capacity of a logical disk drive based on the amount.

4. The method of claim 1, wherein the at least one logical representation is a logical volume comprising a logical unit number, and wherein the data store uniquely identifies the logical volume based on the logical unit number.

5. The method of claim 1, wherein the at least one processor and the physical storage is included in a host machine executing the virtual machine and wherein the amount is determined from a policy corresponding to the virtual machine.

6. A system for provisioning virtual machine storage comprising:
   a host computing device comprising:
      a data store including a virtual machine;
      a physical storage communicatively connected to the virtual machine and at least one processor, the at least one processor executed to:
         determine whether at least one logical representation of the physical storage requires an increase in storage capacity, the at least one logical representation of the physical storage corresponding the virtual machine, wherein the increase in storage capacity is determined by the virtual machine based on a first capacity of the at least one logical representation; and
         when the increase in storage capacity of the at least one logical representation is required:
            increase at a storage layer of a virtual environment the first capacity of the at least one logical representation by an amount of storage capacity;
            increase at a hypervisor layer of the virtual environment a second capacity of the data store based on the amount of storage capacity;
            increase at a virtual machine layer of the virtual environment a third capacity of a virtual machine disk corresponding to the virtual machine based on the amount of storage capacity; and
            execute logic at a guest operating system executed by the virtual machine to resize a file system partition of the guest operating system based on the amount of storage capacity, wherein the file system partition corresponds to a file system managing access to the at least one logical representation of the physical storage.

7. The system of claim 6, wherein the at least one processor is executed to determine whether the at least one logical representation of the physical storage requires an increase in storage capacity comprises:
   receiving a request from the virtual machine indicating the required increase in capacity; and
   employing an application programming interface to:
      obtain data defining a current capacity of the data store; and
      require an increase in the second capacity of the data store when the current capacity of the data store exceeds a pre-determined percentage.

8. The system of claim 6, wherein the at least one processor is further executed to:
   when the increase in capacity does not require an increase in the at least one logical representation, increase the third capacity of a logical disk drive based on the amount.

9. The system of claim 6, wherein the at least one logical representation is a logical volume comprising a logical unit number, and wherein the data store uniquely identifies the logical volume according to the logical unit number.

10. The system of claim 6, wherein the at least one processor and the physical storage is included in a host machine executing the virtual machine and wherein the amount is determined from a policy corresponding to the virtual machine.

11. A non-transitory computer readable medium encoded with instructions for provisioning virtual machine storage, when executed by a processor, the instructions operable to perform:
   determining whether at least one logical representation of a physical storage requires an increase in storage capacity, the at least one logical representation of the physical storage corresponding a virtual machine maintained in a data store, wherein the increase in storage capacity is determined by the virtual machine based on a first capacity of the at least one logical representation;

when the increase in storage capacity of the at least one logical representation is required:
increase at a storage layer of a virtual environment the first capacity of the at least one logical representation by an amount of storage capacity;
increase at a hypervisor layer of the virtual environment a second capacity of the data store based on the amount of storage capacity;
increase at a virtual machine layer of the virtual environment a third capacity of a virtual machine disk corresponding to the virtual machine based on the amount of storage capacity; and
execute logic at a guest operating system executed by the virtual machine to resize a file system partition of the guest operating system based on the amount of storage capacity, wherein the file system partition corresponds to a file system managing access to the at least one logical representation of the physical storage.

12. The non-transitory computer readable medium of claim 11, wherein the instructions are further operable to perform determining whether the at least one logical representation of the physical storage requires an increase in storage capacity comprises:

receiving a request from the virtual machine indicating the required increase in capacity; and
employing an application programming interface to:
obtain data defining a current capacity of the data store; and
require an increase in the second capacity of the data store when the current capacity of the data store exceeds a pre-determined percentage.

13. The non-transitory computer readable medium of claim 11, wherein the instructions are further operable to perform:
when the increase in storage capacity does not require an increase in the at least one logical representation, increasing capacity of a virtual machine disk based on the capacity.

14. The non-transitory computer readable medium of claim 11, wherein the at least one logical representation is a logical volume comprising a logical unit number, and wherein the data store accesses the logical volume using the logical unit number.

15. The non-transitory computer readable medium of claim 11, wherein the processor and the physical storage is included in a host machine executing the virtual machine, and wherein the amount is determined from a policy corresponding to the virtual machine.

\* \* \* \* \*